United States Patent
Ratzabi

(10) Patent No.: US 11,647,858 B2
(45) Date of Patent: May 16, 2023

(54) INVERTED FIT HANGER

(71) Applicant: Moshe Ratzabi, Brooklyn, NY (US)

(72) Inventor: Moshe Ratzabi, Brooklyn, NY (US)

( * ) Notice: Subject to any disclaimer, the term of this patent is extended or adjusted under 35 U.S.C. 154(b) by 0 days.

(21) Appl. No.: 17/701,904

(22) Filed: Mar. 23, 2022

(65) Prior Publication Data

US 2022/0211202 A1    Jul. 7, 2022

Related U.S. Application Data

(63) Continuation-in-part of application No. 16/908,939, filed on Jun. 23, 2020, now abandoned.

(51) Int. Cl.
*A47G 25/32* (2006.01)
*F16B 45/06* (2006.01)
*F16B 45/02* (2006.01)

(52) U.S. Cl.
CPC ............ *A47G 25/32* (2013.01); *F16B 45/035* (2021.05); *F16B 45/06* (2013.01)

(58) Field of Classification Search
CPC .............. A47G 25/32; A47G 25/14–60; A47G 25/1442; A47G 25/1457; A47G 25/1485; A47G 25/1492; A47G 25/325; F16B 45/035; F16B 45/06; F16B 45/02; F16B 45/023; F16B 45/024; F16B 45/026; F16B 45/034
See application file for complete search history.

(56) References Cited

U.S. PATENT DOCUMENTS

| | | | |
|---|---|---|---|
| 1,859,353 A | | 5/1932 | Boone |
| 2,046,654 A | * | 7/1936 | Rosen ............... A47G 25/32 223/1 |
| 2,456,374 A | | 12/1948 | Carter |
| 2,480,420 A | | 8/1949 | Pochini |
| 2,538,755 A | | 1/1951 | Bradley |
| 2,656,078 A | * | 10/1953 | Ambrosino ....... A47G 25/1407 223/95 |
| 2,864,147 A | | 12/1958 | Solow |
| 2,877,940 A | * | 3/1959 | Pressler ............. A47G 25/32 D6/319 |

(Continued)

FOREIGN PATENT DOCUMENTS

WO    9413512 A1    6/1994

*Primary Examiner* — Ismael Izaguirre
(74) *Attorney, Agent, or Firm* — Mandelbaum Silfin Economou LLP

(57) ABSTRACT

A garment hanger has a body for supporting a garment and an attachment mechanism for coupling the garment hanger to a garment rod. The attachment mechanism is mounted on a top central portion of the body and has a first semi-circular ring member, a second semi-circular ring member, a bracket, and a spring means. Each semi-circular ring member has a first end and a central aperture in proximity to a second end. The bracket has a central horizontal portion and two vertical portions on opposite sides of the central horizontal portion. The first and second semi-circular ring members are mounted in a mirrored direction between the two vertical portions by a shaft passing through a central aperture in each of the two semi-circular ring members. The spring means is coupled to force the first ends of the two semi-circular ring members towards each other.

18 Claims, 5 Drawing Sheets

(56) References Cited

U.S. PATENT DOCUMENTS

| | | | |
|---|---|---|---|
| 3,208,786 A * | 9/1965 | Eddleman | B65D 25/08 |
| | | | 294/115 |
| 3,666,149 A | 5/1972 | Woodhull | |
| 3,794,225 A | 2/1974 | Ashton | |
| 3,831,826 A | 8/1974 | Thomas | |
| 4,155,493 A | 5/1979 | Palmaer | |
| 7,234,615 B2 | 6/2007 | Presser | |
| 2004/0079772 A1 | 4/2004 | Shih | |
| 2009/0145868 A1 * | 6/2009 | Schneuing | A47G 25/1442 |
| | | | 198/465.4 |
| 2012/0326887 A1 * | 12/2012 | Inoko | G06Q 30/02 |
| | | | 340/870.07 |

* cited by examiner

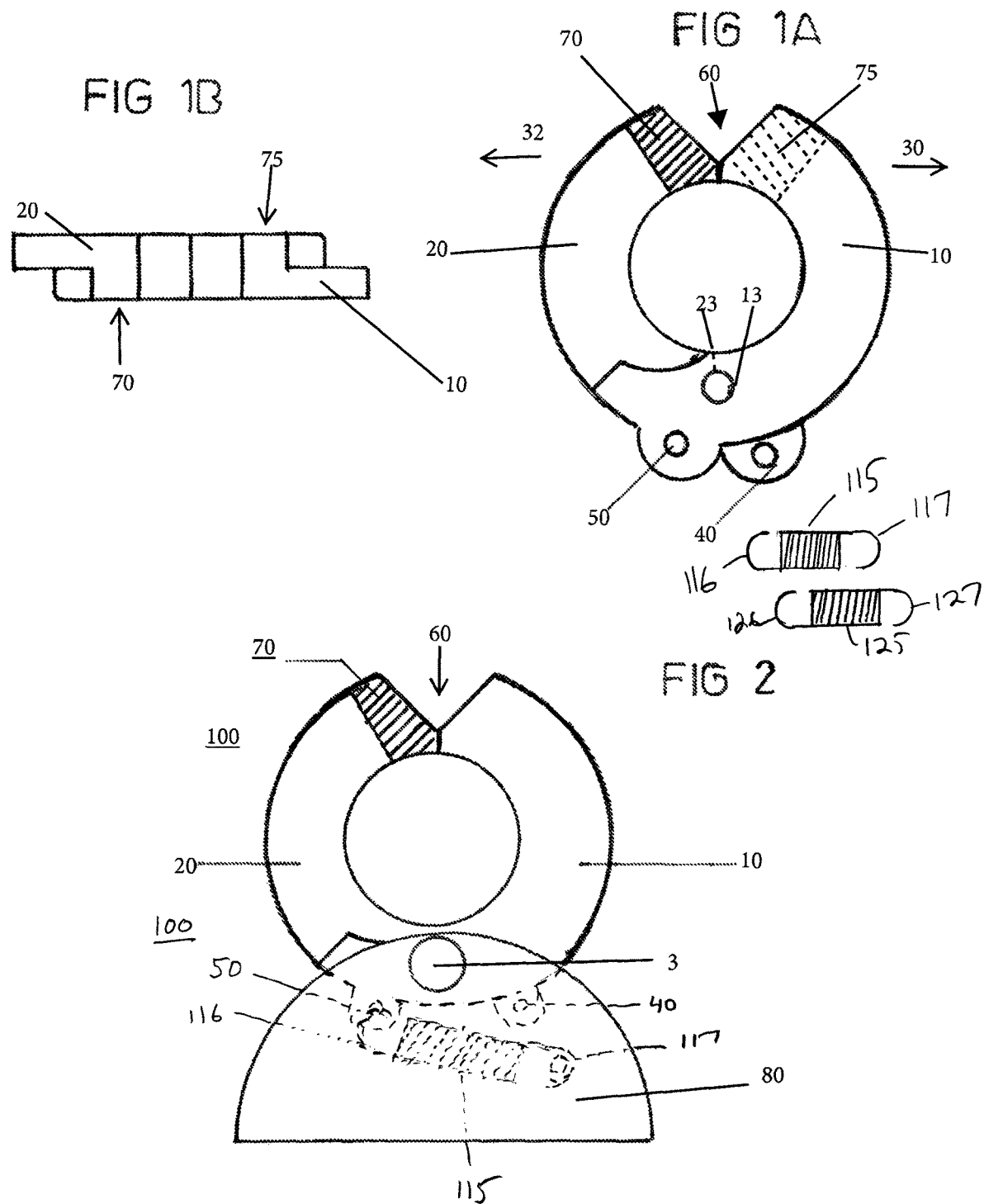

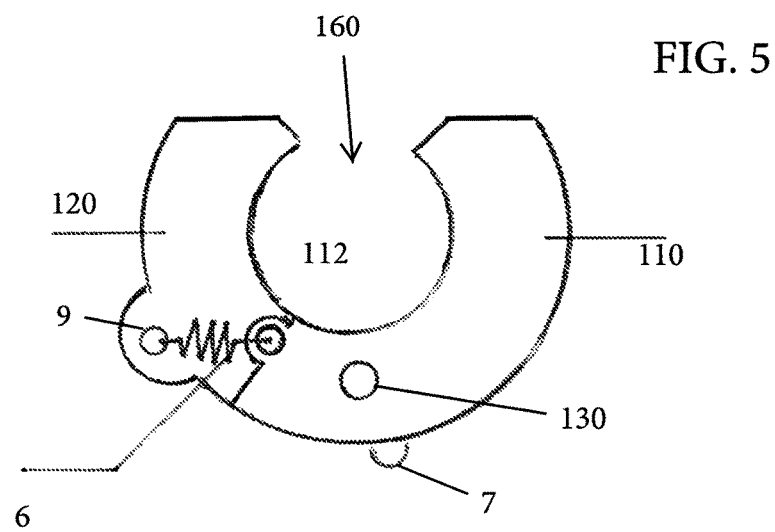
FIG. 5
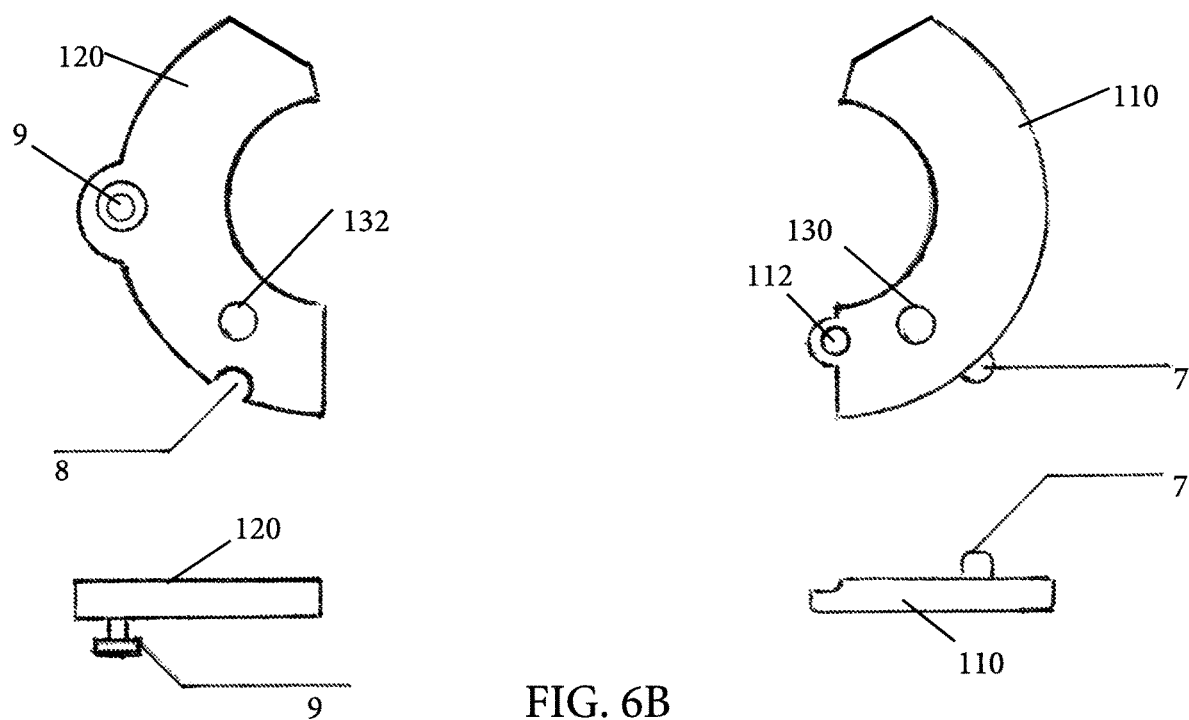
FIG. 6A
FIG. 6B

INVERTED FIT HANGER

CROSS-REFERENCE TO RELATED APPLICATIONS

This application is a continuation-in-part of U.S. application Ser. No. 16/908,939 that was filed on Jun. 23, 2020, the disclosure of which is incorporated herein by reference.

FIELD

The present invention relates generally to the field of garment hangers, and more particularly, it is directed to a garment hanger that is fitted to a conventional hanger rod from below the hanger rod.

BACKGROUND

A hanger is a very frequently used item. Most typically, a horizontal rod (the hanger rod) is provided in a closet, and a hook portion of a hanger is placed over the hanger rod to support a garment supported by other parts of the hanger. This requires extra space above and below the hanger rod to allow the hook portion of the hanger to be fitted thereto. In addition, the hook portion of the hanger may have a pointed tip that can catch on other garments hanging on the hanger rod, causing either damage to the other garments or causing a garment to fall to the floor. Finally, the open nature of the hook portion of a conventional hanger means that a garment hung thereon is subject to being jostled and knocked off of the hanger rod, thereby causing the garment to fall to the floor.

Accordingly, there is a need for an improved hanger that overcomes the foregoing problems.

BRIEF DESCRIPTION OF THE DRAWINGS

The following detailed description, given by way of example and not intended to limit the present disclosure solely thereto, will best be understood in conjunction with the accompanying drawings in which:

FIG. 1A is a side view of a portion of a first embodiment of the attachment mechanism for the hanger of the present disclosure, and FIG. 1B is a top view thereof;

FIG. 2 is a side view of the first embodiment of attachment mechanism for the hanger of the present disclosure;

FIG. 5 is a side view of a portion of a second embodiment of the attachment mechanism for the hanger of the present disclosure;

FIG. 6A is also a side view of the portion of a second embodiment of the attachment mechanism, showing the two semi-circular members separated, and FIG. 6B is a top view thereof;

DETAILED DESCRIPTION

In the present disclosure, like reference numbers refer to like elements throughout the drawings, which illustrate various exemplary embodiments of the present disclosure.

The hanger of the present disclosure uses an attachment mechanism that permits the hanger to be fitted from a lower side of a hanger rod and to stay suspended to the rod in a very close proximity, thereby maximizing the utilization of space within the area in which the hanger rod is mounted (e.g., a closet). The hanger of the present disclosure prevents drops which may inadvertently occur with a conventional hanger when first positioned over the rod and then dropped down to contact the hanger rod. The hanger of the present disclosure employs an attachment mechanism which eliminates the conventional open hook portion for coupling to the hanger rod, which at times can be less safe or may get tangled with other garments hanging on the hanger rod.

As explained below, the hanger of the present disclosure is mounted to the hanger rod by pushing it upward against the hanger rod. This allows the hanger to be suspended very close to the rod. When the hanger is pushed upward against the hanger rod, two semi-circular ring members, which are spring-loaded, open up against a force of the two springs. Then, when the hanger is fully fitted on hanger rod, the two semi-circular ring members close around the hanger rod in order to keep the hanger suspended on the hanger rod. The two semi-circular ring members are sized to form an inner diameter just larger than the diameter of the hanger rod in order to allow the hanger to glide (when pushed or pulled, for example) back and forth along the hanger rod like a conventional hanger. The hanger of the present disclosure is removed from the hanger rod by pulling the hanger away from the hanger rod, thereby causing the two spring-loaded semi-circular ring members to rotate away from each other in order to create an open gap wider than the diameter of the hanger rod, thereby allowing the hanger to be removed from the hanger rod by continuing to pull it away from the hanger rod. The hanger of the present disclosure eliminates the open end hook design of conventional hangers and creates a safer more rounded and symmetric profile, while also providing a modern look.

Figure 3:
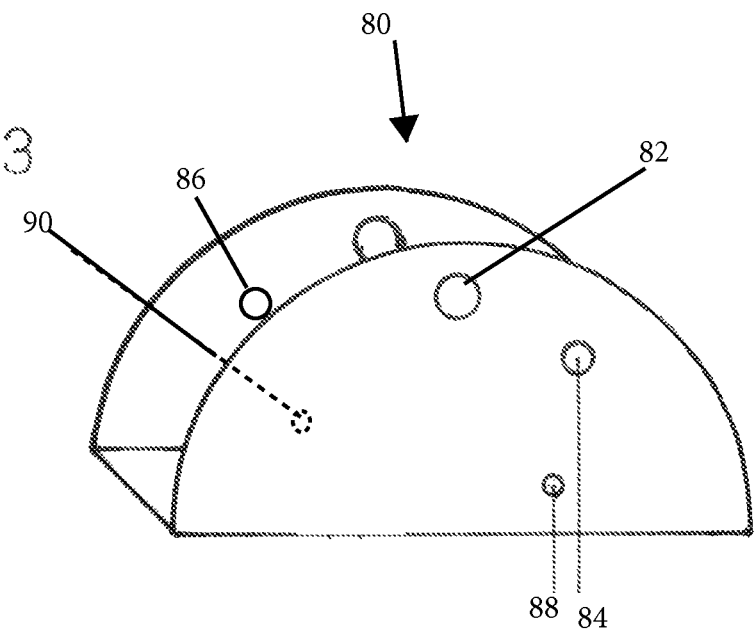
FIG. 3 is a perspective view of a bracket portion of the first embodiment of the attachment mechanism for the hanger of the present disclosure.
Figure 4B:
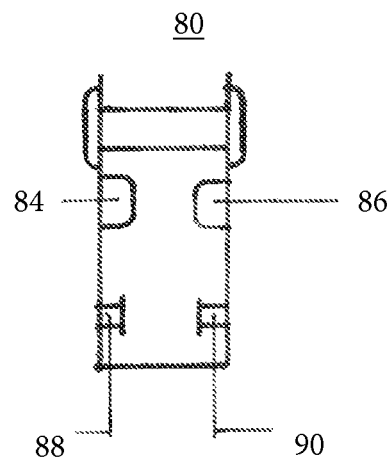
FIG. 4B is a side view thereof.
Figure 4A:
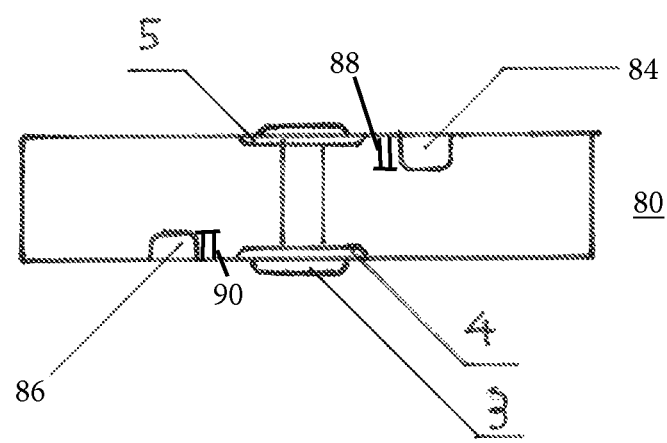
FIG. 4A is a top view of the bracket portion of the first embodiment of the attachment mechanism for the hanger of the present disclosure.

Referring now to FIG. 1A, two semi-circular ring members 10, 20 are shown positioned with semi-circular ring member 10 on top of the semi-circular ring member 20 in the relative position when at rest (i.e., a closed position). The two semi-circular ring members 10, 20 are coupled together via a shaft 3 (e.g., a bolt as shown in FIGS. 4A and 4B) that passes through an aperture 13 in member 10 and an aperture 23 in member 20. Two springs 115, 125 are provided which, when mounted, apply force to hold the two semi-circular ring members 10, 20 together as shown in FIG. 1A but allow the each member 10, 20 to pivot open (around the axis formed by shaft 3) when force is applied in the direction of vector 30, 32, respectfully. Spring 115 has a first end 116 coupled to aperture 50 on member 10 and a second end coupled to a mounting point 88 on bracket 80 (FIG. 3). A top section 70, 75 of semi-circular ring members 10, 20, respectively, preferably has an area with a thicker edge in order to form a contact surface when the semi-circular ring members 10, 20 are closed against each other. In some situations, only one of the two semi-circular ring members 10, 20 may need the area with the thicker edge. The top ends of the two semi-circular ring members 10, 20 are partly beveled inwards to form a V-shaped open area 60. This area 60 allows pressure to be applied in the direction of vectors 30, 32 when the two semi-circular ring members 10, 20 are pressed upwards against a hanger rod, there forcing the two semi-circular ring members 10, 20 apart. FIG. 1B is a top view of the joined two semi-circular ring members 10, 20 and showing the thicker edge areas 70, 75.

Referring now to FIG. 2, a diagram is shown which illustrates the two semi-circular ring members 10, 20 mounted into a housing 80, thereby forming an attachment mechanism 100.

FIG. 3 is an illustration of the housing 80 showing the attachment points 88, 90 for the springs 115, 125, respectively and also shows two cams 84, 86 positioned in an internal portion of housing 80 (see FIGS. 4A and 4B). FIGS. 4A and 4B also illustrate the attachment points 88, 90 and show cams 84, 86 are mounted and positioned on an inner wall of housing 80. An assembly shaft 3, spring washer 4, and washer 5 secure the two semi-circular ring members 10, 20 in the housing 80, allowing each member 10, 20 to rotate on the axis formed by shaft 3, either away from each other or close towards each other as shown in FIGS. 1A and 2.

Figure 7:
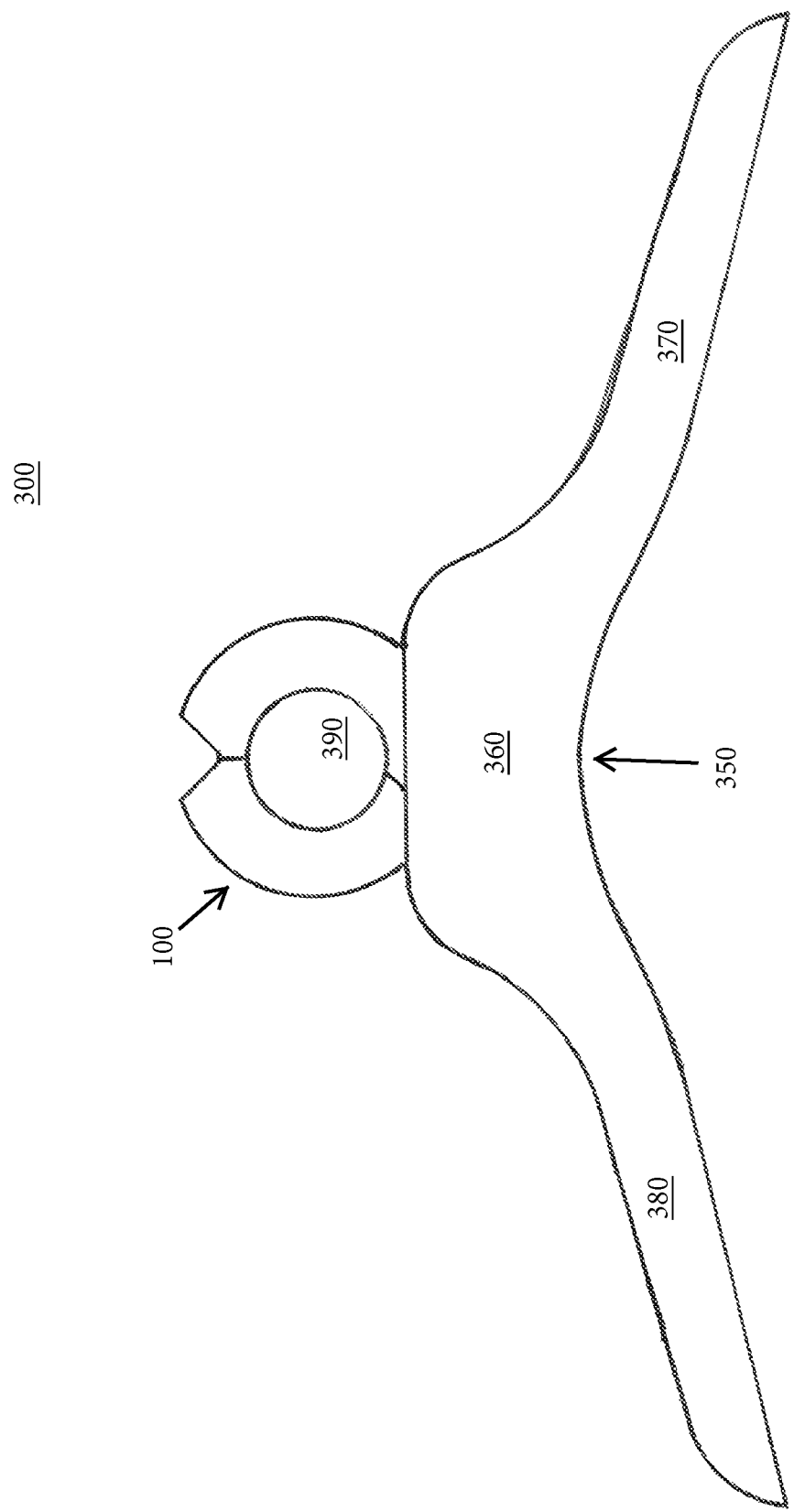
FIG. 7 is a side view of a hanger showing the attachment mechanism positioned on a garment support member.

Referring now to FIG. 7, the attachment mechanism 100 (FIG. 2) is mounted in a cavity at the top of a hanger member 350 (i.e., the body that supports the garment) to form a hanger 300. Hanger member 350 includes a central portion 360 and two side portions 370, 380 for supporting garments. The cavity for the attachment mechanism 100 is on a lower part of the central portion 360, and the two semi-circular ring members 10, 20 extend upwards through a slot in the top centerline of central portion 360. To install hanger 300 on a hanger rod (not shown), the hanger 300 is first positioned with the open area 60 between the two semi-circular ring members 10, 20 aligned against a surface of the hanger rod. The hanger 300 is then pushed directly against the hanger rod, putting additional tension on the two springs 115, 125 and forcing the semi-circular ring members 10, 20 to open and allow the hanger rod to pass into the internal area 390 within the center of the semi-circular ring members 10, 20. Once the hanger rod is within this internal area 390, the semi-circular ring members 10, 20 will close due to the force of the two springs 115, 125 and keep the hanger 300 suspended on the hanger rod (not shown) and allowing it to glide along the hanger rod. The diameter of the circle formed by the inner surface of the two semi-circular ring members 10, 20, when fully closed, is selected to be slightly larger than the diameter of a typical hanger rod. Due to the strength of springs 115, 125, hanger 300 will stay suspended on hanger rods having a smaller diameter than conventional hanger rods. The cams 84, 86 provided on housing 80 provide additional resistance to opening the two semi-circular ring members 10, 20. Each cam 84, 86 moves outward when the associated one of the two semi-circular ring members 10, 20 pushes against it, allowing the respective member 10 or 20 to rotate an additional amount. However, because there is no V-shaped area on an internal portion of the circle formed by the two semi-circular ring members 10, 20, the only way to exert pressure against one of the cams 84, 86 is to perform a two-step operation, first pulling the hanger 300 horizontally to engage one of the cams 84, 86 and creating a gap between the two semi-circular ring members 10, 20. Once the gap is created, the hanger 700 is then moved in an oblique angle so that the hanger rod moves between the gap to disengage hanger 700 from the hanger rod. Only one of the two semi-circular ring members 10, 20 will rotate during disengagement, because the relative position of cams 84, 86 with respect to the two semi-circular ring members 10, 20 ensure that the only way to provide force against one or the other of cams 84, 86 is by moving the hanger 300 laterally (horizontally) with respect to the hanger rod. This ensures that the hanger 300 held to the hanger rod independently of downward (vertical) forces on the hanger 300 and thereby preventing accidental drops of garments when hanger 300 is positioned on the hanger rod.

FIGS. 5, 6A, and 6B illustrate a second embodiment of an attachment mechanism for the hanger of the present disclosure. In this embodiment, the two semi-circular ring members 110, 120 have apertures 130, 132, respectively, for coupling via a shaft 3 as in the first embodiment. The two semi-circular ring members 110, 120 are formed to have a limited range of rotation around the axis formed by the shaft 130 and to have a gap 160 at top portion when the semi-circular ring members 110, 120 are closed. In addition, the upper ends of the two semi-circular ring members 110, 120 may be beveled to allow the hanger rod to be placed closer to a surface directly above (e.g., a ceiling or a shelf). A compression spring 6 is coupled between an attachment point 9 on member 120 and an aperture 112 on member 110 and provides constant tension to keep the two semi-circular ring members 10, 20 in the closed position shown in FIG. 5. Spring 6 may be compressed additionally to allow the gap 160 to increase to allow a hanger rod to move into the interior area formed by the two semi-circular ring members 110, 120. A single cam 7 is provided on semi-circular ring member 110 that fits into a cavity 8 on semi-circular ring member 120 when the two semi-circular ring members 110, 120 rotate with respect to each other on the axis formed by shaft 3. The two semi-circular ring members 110, 120 are mounted in housing 80 (FIG. 3) but without the additional springs 115, 125 required in the first embodiment. When semi-circular ring members 110, 120 close towards each other, the movement will stop when cam 7 engages with cavity 8 to form a semi-circle of about 310 degrees, leaving gap 160 at the top of about 50 degrees. A hanger including the attachment mechanism of the second embodiment is installed on a hanger rod in the same way as in the first embodiment, by first positioning the hanger so that the gap portion is directly against the hanger rod, and then pushing the hanger against the hanger rod. The two semi-circular ring members 110, 120 will pivot around the axis formed by shaft 3 enough to allow the hanger rod to move within the central area formed by the two semi-circular ring members 110, 120. Once the hanger rod is within that central area, the outward forces of compressed spring 6 will force the two semi-circular ring members 110, 120 to rotate back around the hanger rod so that the hanger will hang on hanger rod as in the first embodiment. To remove the hanger, the hanger is moved horizontally, in either direction L2 or R2 (FIG. 5). When moved in direction L2, an internal surface of the semi-circular ring member 120 moves against the hanger rod causing member 120 to rotate counter clockwise away from semi-circular ring member 110, opening the gap 160 wide enough to allow the hanger rod to pass through gap 160 when the hanger is further pulled out in an oblique angle. When the hanger is moved in this manner, the movement of semi-circular ring member 110 is restricted by cam 86. When the hanger is moved in direction R2, the opposite occurs, semi-circular ring member 110 rotates in the direction R2 in order to create a wider gap 160 (to allow the hanger rod to pass through) and the movement of semi-circular ring member 120 is restricted by cam 84. This embodiment fits a hanger rod having a diameter slightly smaller than a diameter formed by the interior surface of the two semi-circular ring members 110, 120 or smaller diameter rods down to a size just larger than the gap 160 found when the two semi-circular ring members 110, 120 are closed as in FIG. 5. In addition, this embodiment provides a hanger that does not contact the top surface of the hanger rod.

Figure 8:
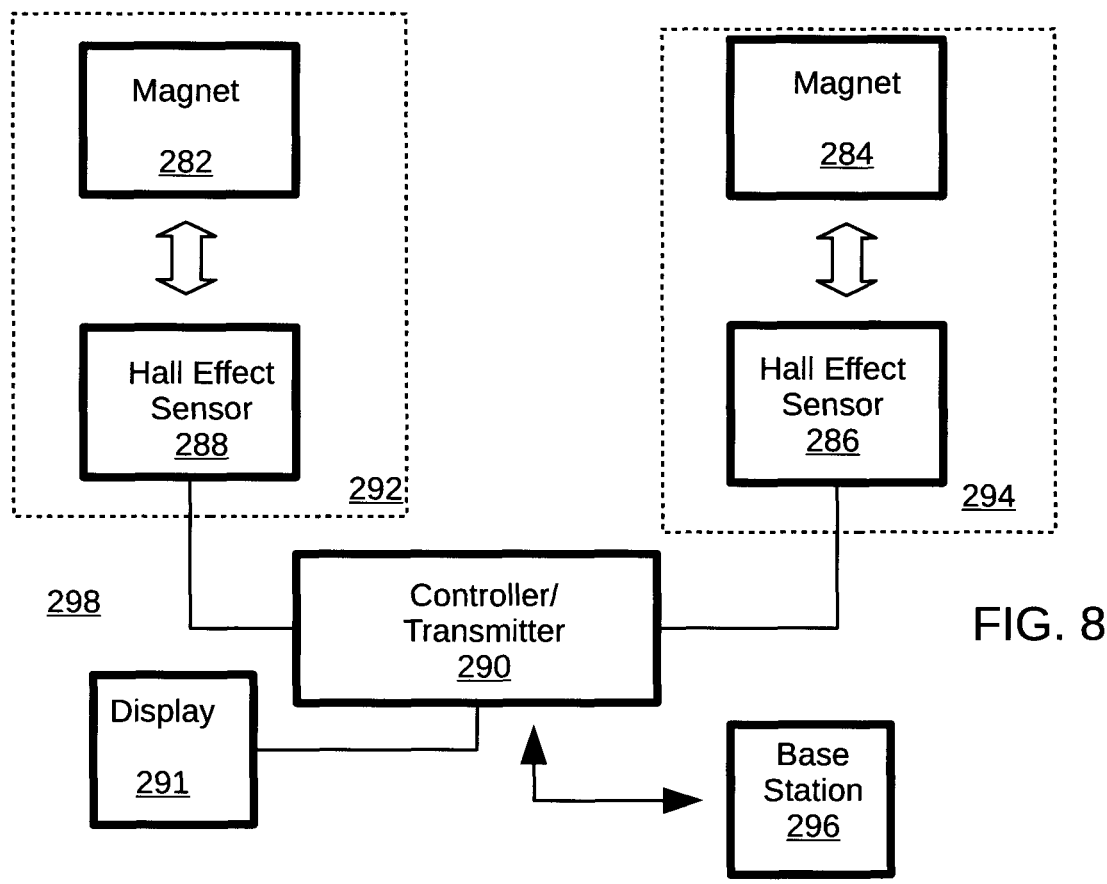
FIG. 8 is a schematic block diagram of a circuit for a further embodiment for the attachment mechanism of the hanger of the present disclosure.
Figure 9:
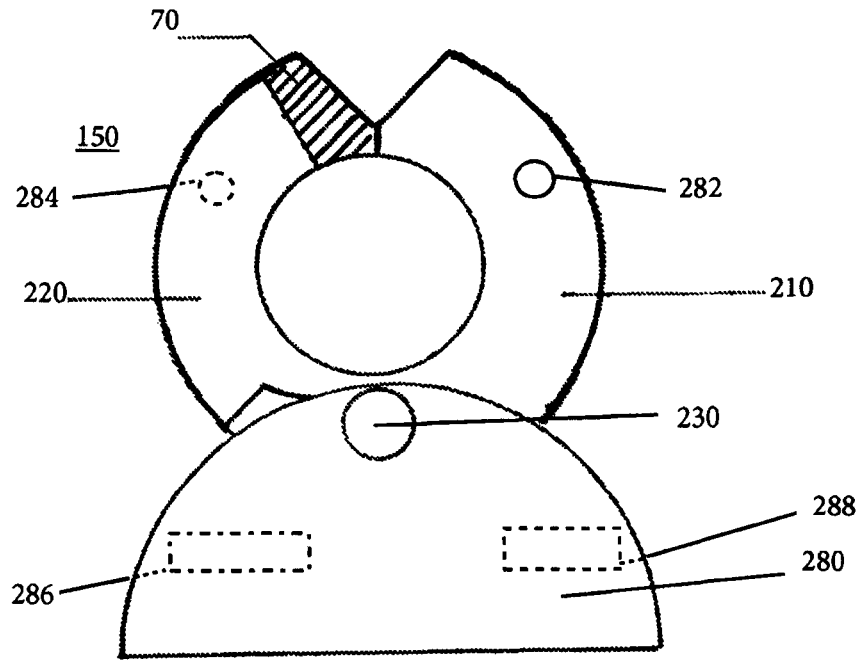
FIG. 9 is a schematic block diagram of the further embodiment for the attachment mechanism of the hanger of the present disclosure.

Referring now to FIGS. 8 and 9, in some situations it may be desirable to monitor the status of the use of a hanger, e.g., to monitor the number of coats checked in a cloakroom during a fixed period of time. The circuit 298 shown in FIG. 8 can be added to either of the above attachment mechanism embodiments (shown generically as mechanism 150 in FIG. 9) in order to track each time a hanger is either mounted to a hanger rod or removed therefrom. The circuit 298 includes two sensor assemblies 292, 294 which are each coupled to a controller/transmitter 290. Each sensor assembly 292, 294 may consist of a respective magnet 282, 284 mounted on an associated one of the two semi-circular ring members 210, 220 and a respective Hall Effect sensor 288, 286 mounted on the bracket 280. When the magnet 282 moves close to Hall Effect sensor 288, a signal will be generated by the Hall Effect sensor 288 and received by controller/transmitter 290. Likewise, when the magnet 284 moves close to Hall Effect sensor 286, a signal will be generated by the Hall Effect sensor 286 and received by controller/transmitter 290. In this way, controller/transmitter 290 can track the status of the associated hanger to which mechanism 150 is mounted, i.e., either on a hanger rod or removed from a hanger rod. Controller/transmitter 290 may be coupled to an optional display 291 that provides a visual indication of the status of the hanger (e.g., green and red LEDS, the green LED indicating available for use and the red LED indicating in use). Controller/transmitter 290 may also provide a wireless signal to a remote base station 296 that provides status information about the hanger (e.g., hanger ID and status of either on or off the hanger rod). Controller/transmitter 290 is powered by a battery, not shown, and is mounted either within or adjacent to bracket 280. The wireless signal may be one of the many low-power RF-based technologies currently available such as Bluetooth low energy, ANT, ZigBee, RF4CE, NFC, Nike+, and Wi-Fi. This information can be tabulated and used to monitor the number of coats checked during a fixed period of time, etc. The mechanism 150 in FIG. 9 is shown using sensor assemblies based on the Hall Effect. Other types of proximity sensors may be used instead, for example, a reed switch, an optical sensor, a photoelectric sensor, etc. A hanger implemented using the mechanism 150 provides added benefit at a low cost for tracking hanger usage.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A garment hanger, comprising:
a body for supporting a garment; and
an attachment mechanism for coupling the garment hanger to a garment rod, the attachment mechanism mounted on a top central portion of the body, the attachment mechanism comprising:
a first semi-circular ring member, the first semi-circular ring member having a first end, a central aperture in proximity to a second end, and a second aperture on a tab extending outward from an outer diameter surface in close proximity to the second end, the second aperture closer to the second end than the central aperture;
a second semi-circular ring member, the second semi-circular ring member having a first end, a central aperture in proximity to a second end, and a second aperture on a tab extending outward from an outer diameter surface in proximity to the second end, the second aperture closer to the second end than the central aperture;
a bracket for holding the first semi-circular ring member and the second semi-circular ring member, the bracket having a central horizontal portion and two vertical portions on opposite sides of the central horizontal portion, a central aperture on each of the two vertical portions for receiving a shaft for holding the first and second semi-circular ring members between the two vertical portions, the shaft passing through the central aperture in each of the two semi-circular ring members, the first semi-circular ring member arranged in a mirrored direction to the second semi-circular ring member so that the inner diameter surface of the two semi-circular ring members forms a complete circle when the two semi-circular ring members are rotated on a central axis of the shaft so that the first ends thereof are touching each other;
a first spring having a first end coupled to the second aperture of the first semi-circular ring member and to a tab on an inner surface of the vertical portion of the bracket closes to the first semi-circular ring member, the tab positioned so that pressure is applied to the first semi-circular ring member so that it rotates towards the second semi-circular ring member; and
a second spring having a first end coupled to the second aperture of the second semi-circular ring member and to a tab on an inner surface of the vertical portion of the bracket closes to the second semi-circular ring member, the tab positioned so that pressure is applied to the second semi-circular ring member so that it rotates towards the first semi-circular ring member.

2. The garment hanger of claim 1, wherein each of the two semi-circular ring members is partly beveled inwards to form a V-shaped open area facing upwards when the two semi-circular ring members are rotated so that the first ends thereof are touching each other.

3. The garment hanger of claim 1, wherein each of the vertical portions of the bracket include a cam mounted on an internal surface thereof, each cam positioned to extend inward when the two semi-circular ring members are rotated so that the first ends thereof are touching each other and to provide resistance rotation, until sufficient pressure is applied, of an associated one of the two semi-circular ring members when that semi-circular ring member is rotated away from the other semi-circular ring members.

4. The garment hanger of claim 1, wherein each of the two semi-circular ring members has a thickness at an area adjacent to the first end thereof that is greater than a thickness at the second end thereof.

5. The garment hanger of claim 1, wherein each of the vertical portions of the bracket have a semi-circular shape.

6. A garment hanger, comprising:
a body for supporting a garment; and
an attachment mechanism for coupling the garment hanger to a garment rod, the attachment mechanism mounted on a top central portion of the body, the attachment mechanism comprising:

a first semi-circular ring member, the first semi-circular ring member having a first end, a central aperture in proximity to a second end, a second aperture on a tab extending outward from the second end, and a cam mounted in proximity to the second end;

a second semi-circular ring member, the second semi-circular ring member having a first end, a central aperture in proximity to a second end, a spring attachment point on a tab extending outward from an outer diameter surface in proximity to a central area of the second semi-circular ring member, and a cavity in proximity to the second end at the outer diameter surface;

a bracket for holding the first semi-circular ring member and the second semi-circular ring member, the bracket having a central horizontal portion and two vertical portions on opposite sides of the central horizontal portion, a central aperture on each of the two vertical portions for receiving a shaft for holding the first and second semi-circular ring members between the two vertical portions, the shaft passing through the central aperture in each of the two semi-circular ring members, the first semi-circular ring member arranged in a mirrored direction to the second semi-circular ring member so that the inner diameter surface of the two semi-circular ring members forms a partial circle when the two semi-circular ring members are rotated on a central axis of the shaft towards each other until the cam on the first semi-circular ring member engages with the cavity on the second semi-circular ring member;

a spring having a first end coupled to the second aperture of the first semi-circular ring member and to the spring attachment point on the second semi-circular ring member, the spring providing pressure to the two semi-circular ring members to resist rotation away from each other at the first end of each semi-circular ring member.

7. The garment hanger of claim 6, wherein each of the two semi-circular ring members is partly beveled inwards.

8. The garment hanger of claim 6, wherein each of the vertical portions of the bracket have a semi-circular shape.

9. A garment hanger, comprising:

a body for supporting a garment; and an attachment mechanism for coupling the garment hanger to a garment rod, the attachment mechanism mounted on a top central portion of the body, the attachment mechanism comprising:

a first semi-circular ring member, the first semi-circular ring member having a first end and a central aperture in proximity to a second end;

a second semi-circular ring member, the second semi-circular ring member having a first end, and a central aperture in proximity to a second end; and a bracket for holding the first semi-circular ring member and the second semi-circular ring member, the bracket having a central horizontal portion and two vertical portions on opposite sides of the central horizontal portion, a central aperture on each of the two vertical portions for receiving a shaft for holding the first and second semi-circular ring members between the two vertical portions, the shaft passing through the central aperture in each of the two semi-circular ring members, the first semi-circular ring member arranged in a mirrored direction to the second semi-circular ring member;

spring means for forcing the first end of the first semi-circular ring member towards the first end of the second semi-circular ring member; and a first sensor coupled to detect when the first semi-circular ring member rotates away from the second semi-circular ring member.

10. The garment hanger of claim 9, wherein the attachment means further comprises a second sensor coupled to detect when the second semi-circular ring member rotates away from the first semi-circular ring member.

11. The garment hanger of claim 9, wherein the attachment means further comprises a controller/transmitter coupled to the first sensor for providing a signal to a base station when the first semi-circular ring member rotates away from the second semi-circular ring member.

12. The garment hanger of claim 10, wherein the attachment means further comprises a controller/transmitter coupled to the first sensor for providing a wireless signal to a base station when the first semi-circular ring member rotates away from the second semi-circular ring member and to the second sensor for providing a signal to the base station when the second semi-circular ring member rotates away from the first semi-circular ring member.

13. The garment hanger of claim 12, further comprising a display for providing an visual indication of hanger status information.

14. The garment hanger of claim 12, wherein the wireless signal is transmitted using a low-power RF technology.

15. The garment hanger of claim 9, wherein the first sensor comprises a magnet mounted on the first semi-circular ring member and a Hall Effect sensor mounted on the bracket.

16. The garment hanger of claim 10, wherein the second sensor comprises a magnet mounted on the first semi-circular ring member and a Hall Effect sensor mounted on the bracket.

17. The garment hanger of claim 9, wherein the first sensor is one of a reed switch, an optical sensor, and a photoelectric sensor.

18. The garment hanger of claim 10, wherein the second sensor comprises a magnet mounted on the first semi-circular ring member and a Hall Effect sensor mounted on the bracket.

* * * * *